SIGNAL-AMPLITUDE RESPONSIVE CIRCUIT

Filed Dec. 31, 1953 2 Sheets-Sheet 1

INVENTOR.
EDWIN A. GOLDBERG

BY Morris A. Rabkin

ATTORNEY

INVENTOR.
EDWIN A. GOLDBERG
BY Morris A. Rabin
ATTORNEY

United States Patent Office 2,838,663

Patented June 10, 1958

2,838,663

SIGNAL-AMPLITUDE RESPONSIVE CIRCUIT

Edwin A. Goldberg, Princeton Junction, N. J., assignor to Radio Corporation of America, a corporation of Delaware Application December 31, 1953, Serial No. 401,682

10 Claims. (Cl. 250—27)

Figure 1:
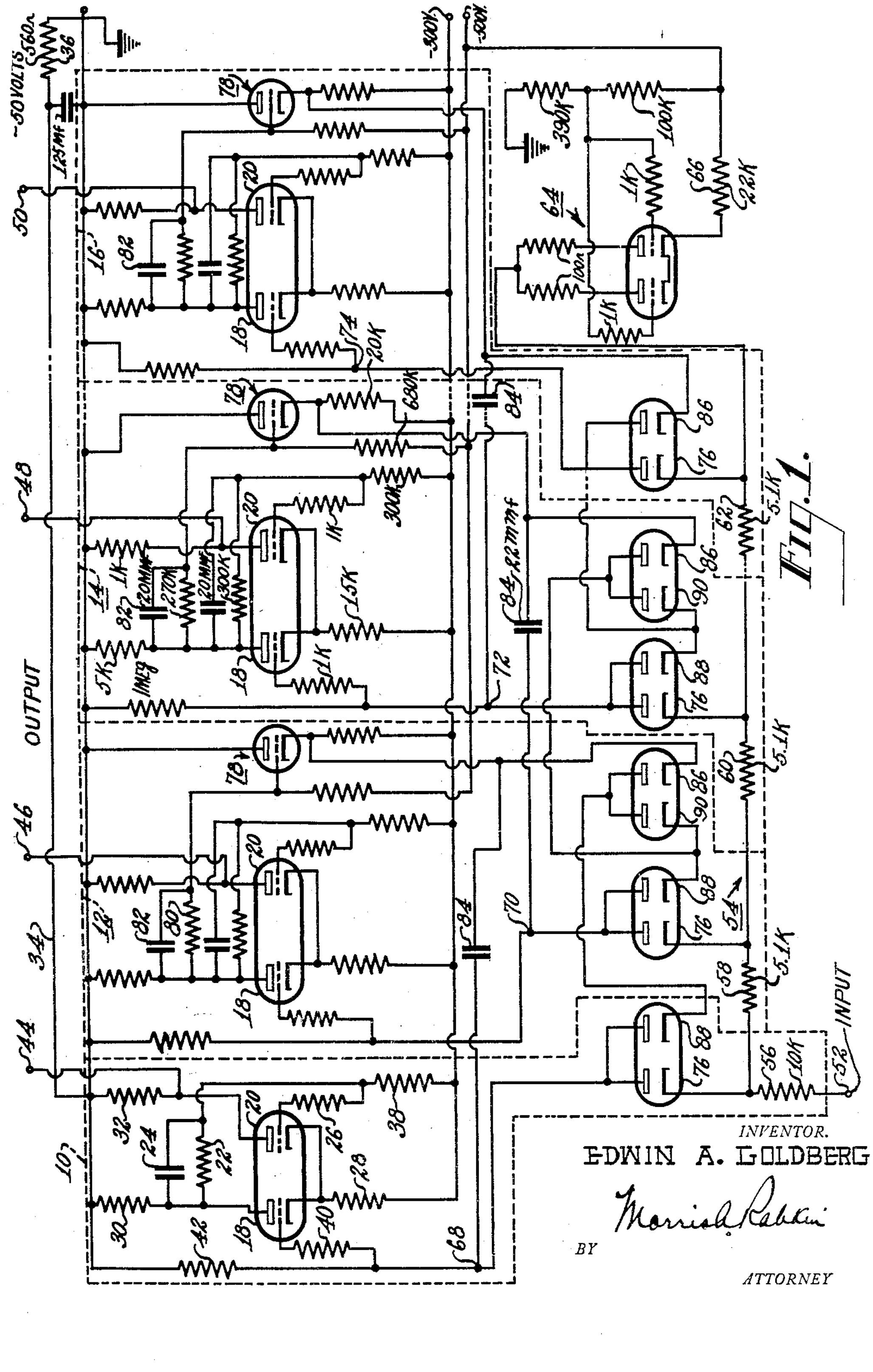

This invention relates to electrical translation systems for electrical signals of varying amplitude, and particularly to electronic circuits for classifying or quantizing a signal in accordance with its amplitude.

Quantizing circuits in the computer field are sometimes used to convert signals in analogue form to a digital form. For example, the reading of an instrument in the form of a voltage of varying amplitude may be converted to a signal on one of a plurality of channels in accordance with the voltage amplitude. Different switching operations may be initiated depending upon the channel to which the signal is applied. Circuits that are used for quantizing are described in U. S. Patents Nos. 2,486,391, 2,552,013 and 2,529,666.

In some applications of a quantizing circuit, it is desirable that there be a "backlash" or hysteresis operational characteristic of the circuit. That is, as the circuit input voltage increases through discrete levels, the signal is applied successively to the output channels in a predetermined order; and as the voltage decreases through the same or overlapping voltage levels, the signal is applied to the next higher order channels. A circuit having a backlash characteristic may be used where there is a feedback control of the input in accordance with the discrete output channel selected. By means of the backlash characteristic and a feedback network, it is possible to provide an interpolation between two discrete output channels for a voltage that lies between the two corresponding levels. The article "A High-Accuracy Time-Division Multiplier" by E. A. Goldberg, RCA Review, September 1952, pp. 265–274, describes a feedback circuit in which interpolation is achieved by means of a flip-flop that is a two-position quantizing circuit having a backlash characteristic. A backlash quantizing circuit having more than two positions is described in the copending patent application of C. C. Shumard, entitled "Signal-Amplitude Responsive Circuit," Serial No. 401,669, now Patent No. 2,782,373, filed concurrently herewith.

An object of this invention is to provide a new and improved circuit for producing a signal on one of a plurality of discrete outputs in accordance with the amplitude of a varying voltage, and that is adaptable for a large or a small number of outputs.

Another object of this invention is to provide an improved and simple circuit that assumes a plurality of different states in accordance with amplitude variations of a direct voltage.

Another object of this invention is to provide a reliable and accurate circuit having a backlash characteristic for quantizing a varying electrical signal in accordance with its amplitude.

In accordance with this invention, a plurality of trigger circuits are connected in order. Each of the trigger circuits includes a pair of coupled input and output grid-controlled tubes that are biased to be triggered in one direction by a first voltage and to be triggered in the reverse direction by a second voltage of different amplitude. In one condition of each trigger circuit, the input tube is conducting and the output tube is cut off; and in the reverse condition, the output tube is conducting and the input tube is cut off. An input voltage is applied across a voltage divider. The grid of the input tube of each trigger circuit is connected through a switching diode to a different tap on the voltage divider. At the lower extreme of the input voltage range, all of the input tubes are biased to cut off. As the input voltage increases past discrete levels, the input tubes are successively rendered conductive from the first to the last in order. The anode of each input is coupled through a cathode follower and a switching diode network to the grids of all the preceding input tubes. As a result, when any one of the input tubes is rendered conductive by the associated level of the input voltage, a tube cut-off voltage is applied to all the preceding input tubes. Thus, only one of the input tubes conducts for any particular input voltage level, and the associated output tube is the only one that is cut off. A separate output terminal is connected to the anode of each output tube. Only one of the output terminals is at a relatively high potential for any particular input voltage level, and all the other output terminals are at a relatively low potential. As the input voltage decreases from the upper extreme of the voltage range, the input tubes are successively rendered conductive in the opposite order from last to first. However, for a decreasing input voltage, there is a backlash effect due to the different biasing levels of the trigger circuit for triggering in one direction and the other. Each input tube is cut off at a lower input voltage level than that at which the same tube was rendered conductive. Therefore, as the input voltage increases and decreases respectively, the output terminals may be at the high potential for the same input voltage level.

Figure 2:
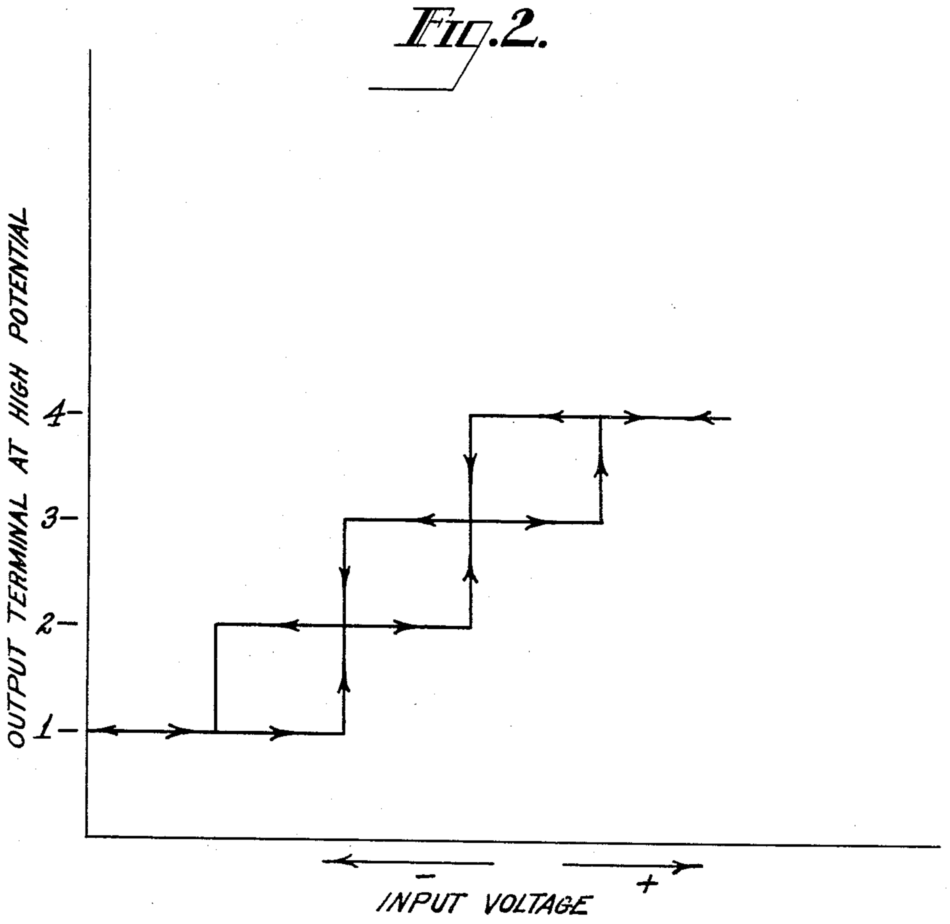

The foregoing and other objects, the advantages and novel features of this invention, as well as the invention itself, both as to its organization and mode of operation, may be best understood when read together with the accompanying drawing in which like reference numerals refer to like parts and in which Figure 1 is a schematic circuit diagram of a voltage amplitude responsive circuit embodying this invention; and Figure 2 is an idealized graph of the operating characteristic of the circuit shown in Figure 1.

The circuit shown in Figure 1 is made up of a plurality of stages 10, 12, 14, 16 arranged in order. The first, second, third and last stages are shown by way of illustration. Each stage includes a trigger circuit having two grid-controlled electron tubes 18, 20 which will be called the input and output tubes for convenience of terminology. All the trigger circuits are identical and are of the type known as a Schmitt trigger circuit. The trigger circuit of only one stage is described. The input tube 18 anode is coupled to the output tube 20 control grid through a resistor 22 and capacitor 24 in parallel and an isolating resistor 26 (to suppress possible parasitic oscillations) in series. The cathodes of the two tubes 18, 20 are connected together and through a common cathode resistor 28 to a negative operating potential, −300 volts. The input tube 18 anode is connected through a load resistor 30 to the operating potential source shown as ground. The output tube 20 anode is connected through a load resistor 32 to a bus 34 that is common to the trigger circuits of all the stages 10 to 16. The bus is connected through a common voltage dropping resistor 36 to ground. The bus 34 is at approximately −50 volts for the specific circuit parameters shown in Figure 1. The output tube 20 control grid is connected through the isolating resistor 26 and a grid resistor 38 in series to the negative source of potential. The input tube 18 control grid is connected through an isolating resistor 40 and a voltage dividing resistor 42 to ground. A separate output terminal 44, 46, 48, 50 is connected to each output tube 20 anode.

An input voltage of varying amplitude is applied to a terminal 52 at one end of a voltage divider 54 that is made up of a plurality of resistors 56, 58, 60, 62 connected in series. Each voltage divider 54 resistor corresponds to a different one of the stages 10, 12, 14, 16 of the circuit. The other end of the voltage divider is connected to the anode of a cathode follower circuit 64 which has a fixed grid bias and that functions as a constant current source. The cathode follower 64 cathode resistor 66 is returned to a second negative operating potential, −500 volts. Each input tube 18 control grid is connected through its isolating resistor 40 to a separate terminal 68, 70, 72, 74 at the anode of a separate one of a plurality of input diodes 76. The diode anode terminals 68 to 74 are the inputs to the respective trigger circuits. Each input diode 76 cathode is connected to the junction at the low voltage end of the associated voltage divider resistor 56 to 62.

Each of the stages 12, 14, 16 other than the first stage 10 also includes a cathode follower 78 made up of a triode, a cathode resistor and a grid resistor connected to the second negative operating potential, −500 volts. Each cathode follower 78 tube anode is connected to ground. Each cathode follower 78 control grid is coupled to the input tube 18 anode of the same stage 12, 14, 16 through a resistor 80 and capacitor 82 in parallel. Each cathode follower 78 cathode is coupled through a capacitor 84 to the input terminal 68, 70, 72 of the next preceding stage. The cathode follower 78 cathode is also connected to the cathode of a first switching diode 86 in the same stage. In each stage 10, 12, 14 except the last stage 16, there is a second switching diode 88 the anode of which is connected to the same stage input terminal 68, 70, 72. Each second switching diode 88 cathode is connected to the first switching diode 86 anode in the succeeding stage 12, 14, 16 and also to the anode of a third switching diode 90 in the succeeding stage 12, 14. A third switching diode is not provided in the first and last stages 10, 16. The third switching diode 90 cathode is connected to the first switching diode 86 anode in the succeeding stage 14, 16.

The circuit is adapted for as many stages as desired. Additional stages (not shown) may be added at the broken-line connections between the third and last stage 14, 16. Additional stages would be the same as the third stage 14. The specific component values given in Figure 1 are illustrative and are not to be construed as a limitation on the scope of the invention. The tube types are: diodes 6AL5, constant-current triode 6J6, and trigger circuit and cathode follower triodes 12AT7. Corresponding components in each stage have the same parameters except where values are otherwise given.

Consider the condition of the circuit when the varying input voltage is at the low extreme of its range, in the neighborhood of −200 volts for the specific circuit parameters given in Figure 1. All the input tubes 18 are cut off, and the output tubes 20 are conducting. Each input tube 18 is cut off by the voltage drop across the common cathode resistor 28. The input diodes 76 are all conducting, and the voltages at each stage input terminal 68 to 74 are below the input tube 18 triggering-on potential. All the output terminals 44 to 50 at the conducting output tube 20 anodes are at a low potential, −60 volts for the specified circuit parameters. The input tube 18 triggering-off potential is at a lower voltage level than the triggering-on potential. This back-lash characteristic is due to the cathode bias furnished by output tube 20 current through the common cathode resistor 28.

As the input voltage increases in the positive direction to about −200 volts, the first stage input terminal 68 voltage increases to the triggering-on potential. The first stage 10 input tube 18 conducts, and the associated output tube 20 is cut off by regenerative action. The first stage output terminal 44 is, therefore, at a relatively high potential, −50 volts, while the other output terminals 46, 48, 50 remain at a low potential, −60 volts.

As the input voltage increases, the voltage divider 54 junction voltages increase substantially the same amount due to a substantially constant current drawn by the constant current tube 64. When the input-voltage increase equals the voltage drop (approximately 25 volts for the specified parameters) across the second stage voltage divider resistor 58, the second stage input terminal 70 increases to the triggering-on potential, and the second stage 12 input tube 18 conducts. The accompanying decrease of input tube 18 anode potential is applied to the grid of the second stage 12 cathode follower 78, and the cathode follower 78 cathode falls to the input tube 18 triggering-off potential. The relatively low triggering-off potential is fed through the second stage 12 first switching diode 86 to the first stage input terminal 68. The first stage 10 input tube 18 is cut off, and the output tube 20 conducts, thereby reducing the potential at the first output terminal 44 to −60 volts. The second output terminal 46 is now the only one at the relatively high potential of −50 volts. Because the first stage input terminal is at the triggering-off potential, the first stage 10 input diode 76 anode is negative with respect to its cathode. Therefore, the first stage 10 input diode 76 is blocked, and the input terminal 68 remains unaffected by changes in the input voltage until the triggering-off holding voltage from a succeeding stage is removed.

When the input voltage increases another step equal to the voltage drop across the third stage 14 voltage divider 60, the third stage 14 input tube 18 conducts. The triggering-off potential at the cathode follower cathode is applied to the second stage input terminal 70 through the third stage 14 first diode 86 and the second stage 12 second diode 88, and also to the first stage input terminal 68 through the second stage 12 third diode 90 and the first stage 10 second diode 88. Thus, the second stage 12 input tube 18 is cut off, and the first stage 10 tube 18 is maintained cut off. Where additional stages (not shown) are employed between the third and last stages 14, 16, the operation for the additional stages is the same as for the third stage 14. When the voltage increases to the high extreme of the voltage range, the last stage 16 input tube 18 is triggered on, and all the preceding stage input tubes are triggered off in the same way. Only one output terminal 44 to 50 is at a high potential at any time. In Figure 2, there is shown an idealized graph of the operating characteristic of the circuit. As the voltage increases through equal steps, the high-potential signal is successively switched from the first 44 to the last output terminal 50. Where unequal voltage steps are desired, the voltage divider 54 resistors (other than that of the first stage) are given different magnitudes.

When the input voltage decreases, the position of the high-potential output terminal changes in reverse order from the last one 50 to the first terminal 44. The last stage 16 input tube 18 continues to conduct until the last stage input terminal 74 falls to the triggering-off potential. The last stage 16 input tube 18 is cut off, and the associated cathode follower 78 cathode rises to the triggering-on potential. This rise in cathode potential is applied to the third stage input terminal 72 through the last stage 16 coupling capacitor 84. Accordingly, the third stage 14 input tube 18 is triggered on as the last stage 16 is triggered off. Consequently, a triggering-off holding potential is furnished by the third stage 14 for maintaining the first and second stages 10, 12 triggered off before the holding potential from the last stage 16 increases sufficiently to allow the first and second stages 10, 12 to trigger on. Without the coupling capacitor 84, short pulses may appear on the outputs 44, 46 of the first and second stages 10, 12 during the transition from the last to the third stage for decreasing input voltages. In the same way, the triggered-on condition passes successively from the third stage 14 to the first stage 10 as the input voltage decreases to the low extreme of the range.

Due to the backlash characteristic of the trigger circuit, the high-potential output terminal at a particular voltage step for a decreasing input voltage is different than that for an increasing input voltage. In the idealized graph of Figure 2, the backlash voltage between the triggering-on and triggering-off potentials is equal to the voltage steps furnished by the voltage-divider 54 resistors. Therefore, the high-potential output terminals for an increasing voltage are the ones preceding the corresponding high-potential terminals for a decreasing voltage. The backlash voltage may be varied by changing the magnitude of the trigger circuit common cathode resistors 28. Where the backlash characteristic is not desired, the backlash voltage may be decreased to a negligible amount by decreasing the magnitude of the common cathode resistor 28.

It is evident from the above description of this invention that a simple and reliable quantizing circuit is provided that has a backlash characteristic or not, as desired. The circuit permits a flexibility of design for a large or small number of stages.

What is claimed is:

1. A circuit that assumes a plurality of different states in accordance with amplitude variations of a direct input voltage, said circuit comprising a plurality of voltage responsive electron control devices each having two conditions of operation and an input terminal, means for biasing each of said control devices to change from one operating condition to the other upon the application to the associated input terminal of a first predetermined voltage and to change from said other to said one operating condition only upon the application to the associated input terminal of a second predetermined voltage substantially different from said first voltage, and input means for applying a different voltage to each of said input terminals in accordance with said direct input voltage including means for varying all of said applied voltages by equal increments proportional to increments of said direct input voltage.

2. A circuit that assumes a plurality of different states in accordance with amplitude variations of an input voltage, said circuit comprising a plurality of voltage responsive electron control devices each having two conditions of operation and an input terminal, means for biasing each of said control devices to change from a first operating condition to a second upon the application to said input terminal of a first predetermined voltage and to change from said second to said first operating condition only upon the application to said input terminal of a second predetermined voltage substantially different from said first voltage, input means for applying voltages to said input terminals in accordance with said input voltage to change successively said control devices in a predetermined order to said second operating condition as said input voltage varies in one direction, and means for applying a first condition voltage to the control devices of preceding order responsive to one of said control devices being changed to said second condition including means for inhibiting the application of said applied voltages to said preceding order control devices.

3. A circuit that assumes at least three states in accordance with amplitude variations of an input voltage having a predetermined range, said circuit comprising at least three voltage-responsive electron control devices having a predetermined order and each having first and second conditions of operation and a separate input terminal, means coupled to said input terminals for applying voltages thereto in accordance with said input voltage with said control devices being operative to be successively changed in order from said first to said second operating condition as said input voltage varies from one extreme of said range to the other, and means for biasing each of said control devices to change respectively from said first to said second operating condition and from said second to said first operating condition responsive solely to substantially different voltage amplitudes, and means responsive to one of said control devices changing to said second operating condition for inhibiting the application of said applied voltages to said control devices of preceding order.

4. A circuit that assumes at least three states in accordance with amplitude variations of an input voltage having a predetermined range, said circuit comprising at least three electron control devices having a predetermined order and each being associated with a different one of said states and having first and second conditions of operation, each of said control devices including a separate input terminal, means coupled to said input terminals for applying different voltages thereto in accordance with said input voltage with each of said control devices being operative to be in said first operating condition at one extreme of said voltage range and to be changed successively in order to said second operating condition as said input voltage varies continuously to the opposite range extreme, and a plurality of separate means each associated with and coupled to a different one of said control devices for applying to all of said devices of preceding order a first operating condition biasing voltage and for inhibiting the application of said different voltages to said preceding order control devices, said last named means being responsive to the associated device when said associated device is in said second operating condition to apply said biasing voltage.

5. A circuit that assumes at least three states in accordance with amplitude variations of an input voltage having a predetermined range, said circuit comprising at least there electron control devices having a predetermined order and each being associated with a different one of said states and having first and second conditions of operation, each of said control devices individually including an input and an output terminal, voltage divider means coupled to said input terminals for applying voltages thereto in accordance with said input voltage with each of said control devices being operative to be in said first operating condition at one extreme of said voltage range and to be changed successively in said order to said second operating condition as said input voltage varies to the opposite range extreme, means for biasing each of said control devices to change from said first to said second operating condition upon the application of a first predetermined voltage and to change from said second to said first operating condition upon the application of a second predetermined voltage substantially different from said first predetermined voltage, and a plurality of separate means each associated with and coupled to a different one of said control devices for applying said second predetermined voltage to the input terminals of said control devices of preceding order, said last named means being responsive to the associated device when said associated device is in said second operating condition to apply said second voltage.

6. A circuit that assumes at least three states in accordance with amplitude variations of an input voltage having a predetermined range, said circuit comprising at least three electron control devices having a predetermined order and each being associated with a different one of said states and having first and second conditions of operation, each of said control devices individually including an input and an output terminal, a voltage divider, means connected to said voltage divider for maintaining a substantially constant current therethrough, means for applying said input voltage to said voltage divider, means coupling said input terminals to different points on said voltage divider whereby all of said control devices are in said first operating condition at one extreme of said voltage range and changed successively in said order to said second operating condition as said input voltage varies to the opposite range extreme, and a plurality of separate means each associated with and coupled to a different one of said control devices for applying first operating condition potentials to the input terminals of said control devices of preceding order, said last named means being responsive to the associated device when said associated device is in said second operating condition to apply said first condition potentials.

7. A circuit that assumes at least three states in accordance with amplitude variations of an input voltage having a predetermined range, said circuit comprising at least three electron control devices having a predetermined order and each being associated with a different one of said states and having first and second conditions of operation, each of said control devices including anode, cathode and control electrodes, means coupled to said control eelctrodes for applying voltages thereto in accordance with said input voltage with each of said control devices being operative to be in said first operating condition at one extreme of said voltage range and to be changed successively in said order to said second operating condition as said input voltage varies to the opposite range extreme, and separate impedance means coupled from the anode of each of said devices to the control electrodes of all of said devices of preceding order for applying thereto a first operating condition biasing voltage said impedance means being responsive to the associated device when said associated device is in said second operating condition to apply said biasing voltage.

8. A circuit that assumes at least three states in accordance with amplitude variations of an input voltage having a predetermined range, said circuit comprising at least three electron discharge tubes having a predetermined order and each being associated with a different one of said states and having an anode, cathode, and control grid, means coupled to said control grids for applying voltages thereto in accordance with said input voltage, each of said tubes being operative to be biased to cut-off condition at one extreme of said voltage range and to be biased successively in said order to a conducting condition as said input voltage varies to the opposite range extreme, and a separate diode coupled from the anode of each of said tubes to the control grids of all of said tubes of preceding order for applying thereto a tube cut-off voltage responsive to the associated tube being in a conducting condition.

9. A circuit that assumes a plurality of different states in accordance with amplitude variations of an input voltage, said circuit comprising a plurality of trigger circuits, each of said circuits including a first and second grid-controlled electron tube, and means coupling said tubes to bias one tube to cut-off when the other tube is conducting and to bias said first tube to have substantially different tube conductive and tube cut-off potentials, a voltage divider for applying different portions of said input voltage to said first tube grids to render said first tubes successively conductive in a predetermined order as said input voltage changes in one direction, and means coupled between each of said first tube grids and the anodes of succeeding first tubes and responsive to conduction in any one of said first tubes for applying a tube cut-off voltage to the grids of preceding order first tubes.

10. A circuit that assumes a plurality of different states in accordance with amplitude variations of an input voltage, said circuit comprising a plurality of trigger circuits each including a first and second grid-controlled electron tube, a common cathode resistor, and a resistor coupling the anode of said first tube to the grid of said second tube, conduction being initiated in each of said first tubes upon the application of a lower voltage, a voltage divider for applying different portions of said input voltage to said first tube grids whereby said first tubes are successively rendered conductive in a predetermined order as said input voltage increases, separate diodes coupled between said voltage divider and said first tube grids, separate output terminals coupled to the anodes of said second tubes, and means coupled between each of said first tube grids and the anodes of succeeding first tubes and responsive to the initiation of conduction in any one of said first tubes for applying a tube cut-off voltage to the grids of preceding first tubes, said conduction responsive means including a separate cathode follower coupled to each first tube anode, and a separate diode coupled to each of said preceding tube grids.

References Cited in the file of this patent

UNITED STATES PATENTS

| | | |
|---|---|---|
| 2,486,391 | Cunningham | Nov. 1, 1949 |
| 2,529,666 | Sands | Nov. 14, 1950 |
| 2,541,039 | Cole | Feb. 13, 1951 |
| 2,653,231 | Cooke-Yarborough | Sept. 22, 1953 |